US00H002183H

(19) United States
(12) Statutory Invention Registration
Wood

(10) Reg. No.: US H2183 H
(43) Published: Mar. 6, 2007

(54) ENVIRONMENTALLY SEALED SHIPPING CONTAINER

(75) Inventor: Larry A. Wood, Dayton, OH (US)

(73) Assignee: The United States of America as represented by the Secretary of the Air Force, Washington, DC (US)

(21) Appl. No.: 10/318,668

(22) Filed: Dec. 12, 2002

Related U.S. Application Data

(60) Provisional application No. 60/340,515, filed on Dec. 14, 2001.

(51) Int. Cl.
*B65D 88/00* (2006.01)

(52) U.S. Cl. ..... 200/1.5; 220/4.28

(58) Field of Classification Search ..... 220/1.5, 220/4.28

See application file for complete search history.

(56) References Cited

U.S. PATENT DOCUMENTS 2,893,588 A 7/1959 Martin
4,050,604 A 9/1977 Flanders
5,170,933 A 12/1992 Perry
5,287,970 A 2/1994 Weidt
5,979,684 A * 11/1999 Ohnishi et al. ..... 220/1.5

* cited by examiner

*Primary Examiner*—Dan Pihulic
(74) *Attorney, Agent, or Firm*—Bobby D. Scearce; Thomas L. Kundert

(57) ABSTRACT

An environmentally sealable plastic shipping container is provided that includes a main container cover and body portion fabricated of a set of plastic extrusions and end caps, connected by tenon-type joints facilitating construction using commercially available adhesives and optional aluminum extrusions with commercially available mechanical fasteners where desirable for rapid opening or closing.

7 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ENVIRONMENTALLY SEALED SHIPPING CONTAINER

CROSS-REFERENCE TO RELATED APPLICATION

This application claims priority of the filing date of Provisional Application Ser. No. 60/340,515 filed 14Dec. 2001, the contents of which are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to reusable shipping containers, and more particularly to an improved reusable shipping container having environmentally sealable modular construction.

Environmentally sealed shipping containers known in the prior art have found substantial use in protecting commercial products under long term storage or in transport under environmentally challenging conditions. The prior art containers typically are constructed of fiberglass, rotationally molded plastic, injection molded plastic, blow molded plastic or welded metal, preferable reusable, and are used in applications in which the protected product may be sensitive to temperature, humidity or other environmental hazards.

Examples of relevant prior art packaging and shipping containers include those disclosed in U.S. Pat. No. 2,893,588 to Martin wherein a drawn sheet of metallic or plastic material pallet is used as the base of a heavy-duty container, in U.S. Pat. No. 4,050,604 to Flanders and U.S. Pat. No. 5,170,933 to Perry disclosing disassemblable reusable containers, and U.S. patent U.S. Pat. No. 5,287,970 to Weidt for a plastic container having pocket-like free spaces. Other reusable containers in the prior art are typically of a heavy metallic construction or are limited to certain specific sizes because of the limitations on the plastic molding processes.

The invention solves or substantially reduces in critical importance problems with previously existing reusable shipping containers by providing an environmentally sealable plastic shipping container having a main container cover and base comprising a set of plastic extrusions and end caps, connected by tenon-type joints facilitating construction using commercially available adhesives and optional aluminum extrusions with commercially available mechanical fasteners where desirable for facilitating rapid opening or closing of the container. The container of the invention may be constructed of substantially any size and rectangular geometry without special molds or tooling. When the container is no longer suitable for its intended purpose, the plastic material of which the container is constructed can be recycled by returning the container to a reprocessing facility for melting or regrinding the plastic for reuse.

It is therefore a principal object of the invention to provide an improved environmentally sealable reusable shipping container.

It is another object of the invention to provide an environmentally friendly shipping container.

It is yet another object of the invention to provide a container easily fabricated to any desired size using standard hardware and no special tools.

It is yet another object of the invention to provide an environmentally sealable container having substantially standard component part configurations and may be fabricated to substantially any size using standard parts.

It is a further object of the invention to provide a container whose structural material can be reground and recycled and reused or remanufactured as a container defined by the invention.

These and other objects of the invention will become apparent as a detailed description of representative embodiments proceeds.

SUMMARY OF THE INVENTION

In accordance with the foregoing principles and objects of the invention, an environmentally sealable plastic shipping container is provided that includes a main container cover and body portion fabricated of a set of plastic extrusions and end caps, connected by tenon-type joints facilitating construction using commercially available adhesives and optional aluminum extrusions with commercially available mechanical fasteners where desirable for rapid opening or closing.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
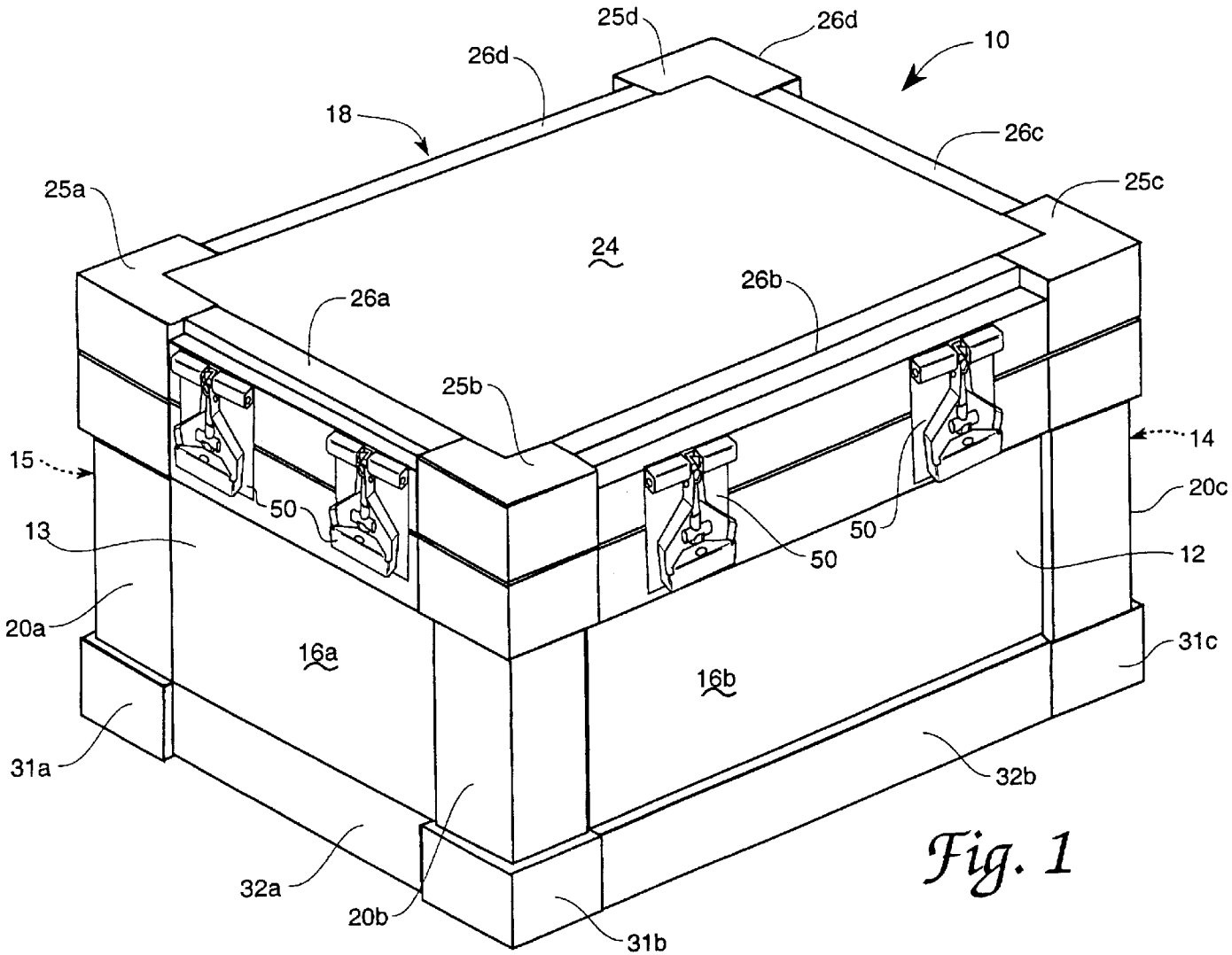
FIG. 1 is a perspective view of a representative embodiment of the container of the invention.

Referring now to the drawings, FIG. 1 shows a schematic perspective view of a representative embodiment of container 10 described and claimed herein. Container 10 of the invention is generally rectangular in shape and includes a base or body portion 11 having and four sides 12,13,14,15, the sides comprising respective rectangular flat panels 16*a–d* all interconnected by corner posts 20*a–d* described in more detail in relation to drawing figures hereinafter presented. Lid or cover 18 for container 10 comprises a rectangular panel 24 and includes corner elements 25*a–d* and edge elements 26 *a–d* also described below in relation to drawings figures hereinafter presented.

Figure 2:
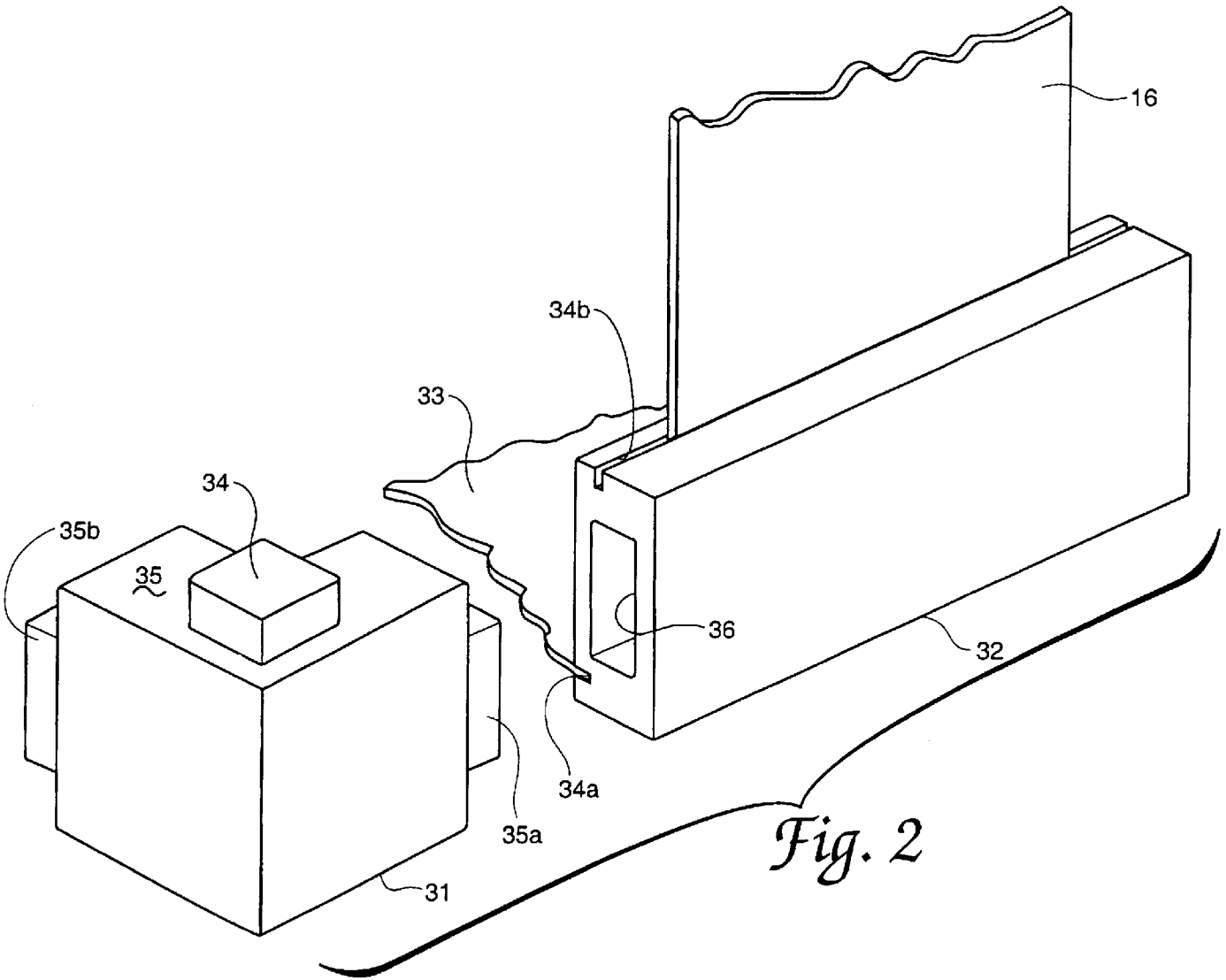
FIG. 2 is a perspective view in cutaway of one corner of the base of the container of FIG. 1, showing the structure of the corner elements and edge extrusion elements of the FIG. 1 container.

Referring now to FIG. 2, shown therein is a perspective view in cutaway of one lower corner of body portion 11 of container 10. Body portion 11 includes four corner elements 31 *a–d,* four edge elements 32*a–d* and flat panel 33 defining the bottom of container 10. Each edge clement 32*a–d* is structured to be a hollow extrusion of substantially any selected length depending on the intended size and shape of container 10 in the final assembled condition. Longitudinal slot 34*a* is defined in each element 32 in order to snugly receive the bottom panel 33 in the assembled condition. A second longitudinal slot 34*b* is defined in the top of each extruded edge element 32 to snugly receive a flat panel 16 defining a side to container 10 in the assembled condition. Corner elements 31 are identical to each other and include a pair of tongue elements or tenons 35*a,b* on adjacent edges of corner element 31, the tenons being sized to be snugly received in the assembled condition by the slot 36 formed in each extruded edge element 32*a–d,* thereby substantially forming tenon/mortise joints at each corner. Raised rectangular portion or flat 34 is defined in the top surface 35 of each corner element 31 for receiving one of the corner posts 20*a–d* as described below in relation to FIG. 3.

Figure 3:
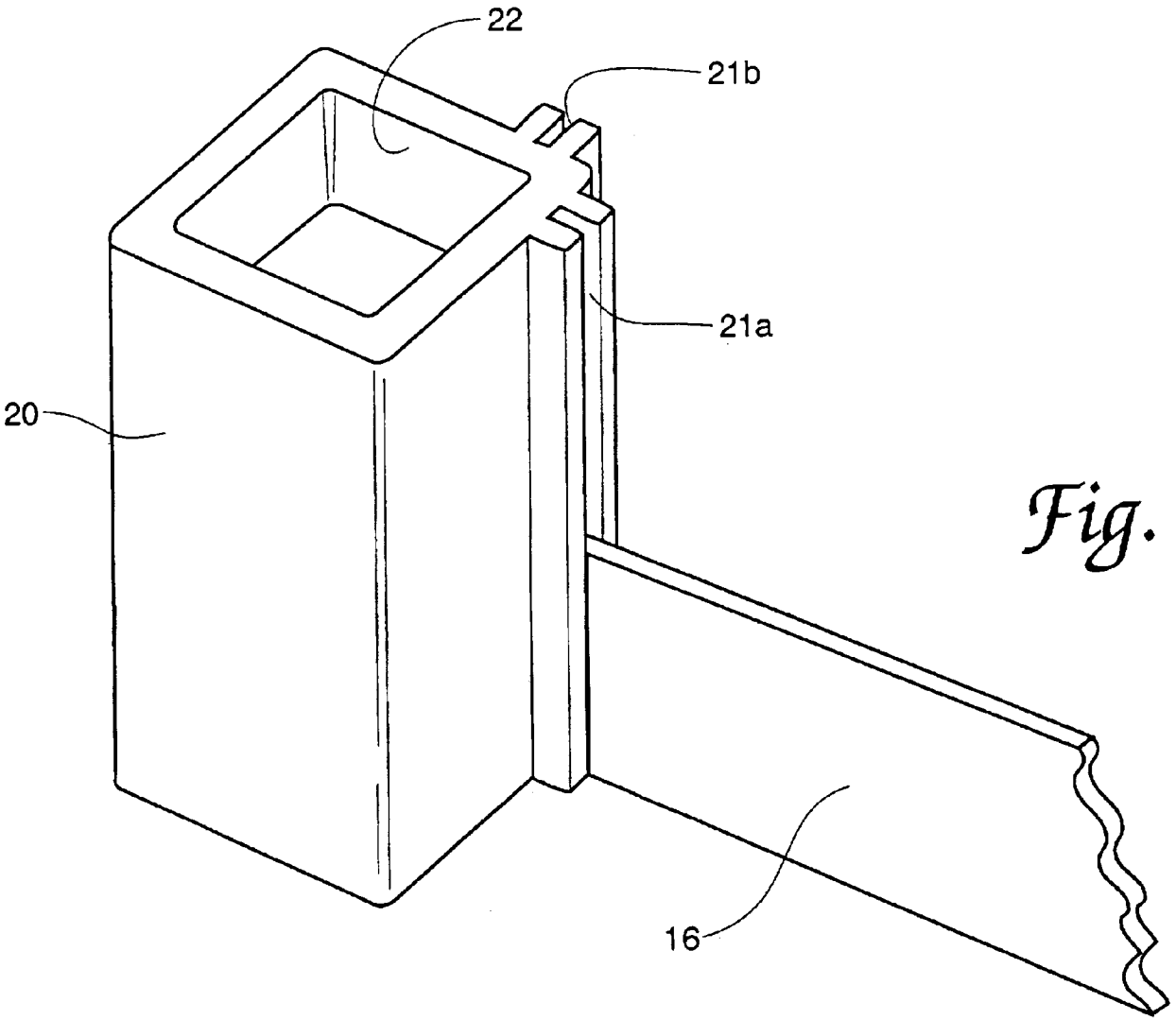
FIG. 3 is a perspective view of a segment of a comer post and a portion of a side element of the container of FIG. 1 illustrating the assembly of the sides and corners of the FIG. 1 container.

Referring now to FIG. 3, shown therein is a perspective view of a segment of one of the corner posts 20*a–d* and a portion of one of the side elements 16*a–d* illustrating the assembly of panels 16*a–d* to the four corner posts 20*a–d* as suggested in FIG. 1. Each corner post 20*a–d* is structured to be a hollow extrusion of substantially any selected length depending on the intended size and shape of container 10 in the final assembled condition. Each corner post 20*a–d* also includes means defining a pair of longitudinal slots 21*a,b* on adjacent surfaces of each post 20*a–d* as suggested in FIG. 3 for receiving two of the panels 16*a–d* defining adjacent sides of body portion 11 in the assembled condition as suggested in FIG. 1. The opening 22 in each extrusion defining a corner post 20 is sized to snugly receive a raised portion 36 in a corner element 31 in body portion 11.

Figure 4:
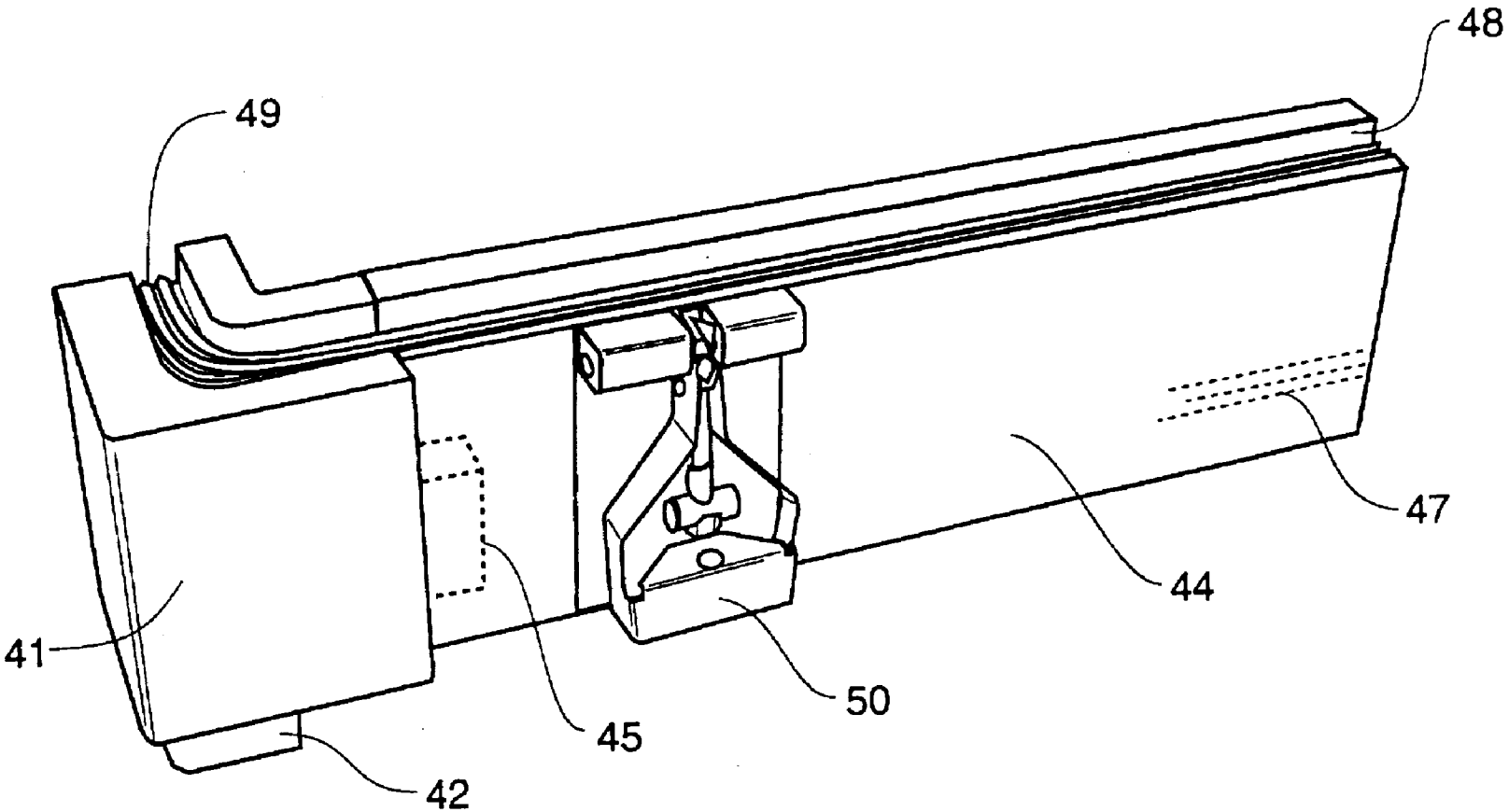
FIG. 4 is a perspective view of an upper corner of the base of the container of FIG. 1 showing the structure that interfaces the lid of the container.

Referring now to FIG. 4, shown therein is a perspective view in partial cutaway of one corner of the top of body portion 11 of container 10. Four substantially identical corner elements 41 are configured similarly to corner elements 31 including a raised portion or flat 42 on the bottom of each corner element 41 and sized to snugly fit into the top of the respective extrusions 20 defining the corner posts of body portion 11. Four edge elements 44 are structured as hollow extrusions similar to edge elements 32 of FIG. 2. Tenons 45 (shown in phantom) on adjacent surfaces of each corner element 41 are sized to snugly fit into the slot defined by edge elements 44 in like manner to the tenon/mortise structure of corner elements 31 and edge elements 32 of the FIG. 2 structure. Elements 44 are sized in correspondence with the selected size of elements 32 to form the container 10 of the desired size and shape. Longitudinal slot 47 is defined in bottom of each element 44 in manner similarly to element 32 above in order to snugly receive a flat panel 16 defining a side to container 10 in the assembled condition. Peripheral groove 48 is defined in the upper surfaces of each of the corner elements 41 and extruded edge elements 44 substantially as shown and extends around the entire periphery of the upper surface of body portion 11. Gasket 49 may be provided in groove 48 for providing a seal with the cover for container 10 as described below in relation to FIG. 5. Two or more latches 50 may be attached in any suitable manner to each edge element 44 substantially as shown in order to tightly attach the cover of container 10 to body portion 11. Latches 50 may be of any commercially available type suitable for attaching the lid to body portion 11, the specific latch selection not considered limiting of the invention. The number of latches attached on each side of container 10 may be selected by the skilled artisan practicing the invention depending on the size selected for container 10.

Figure 5:
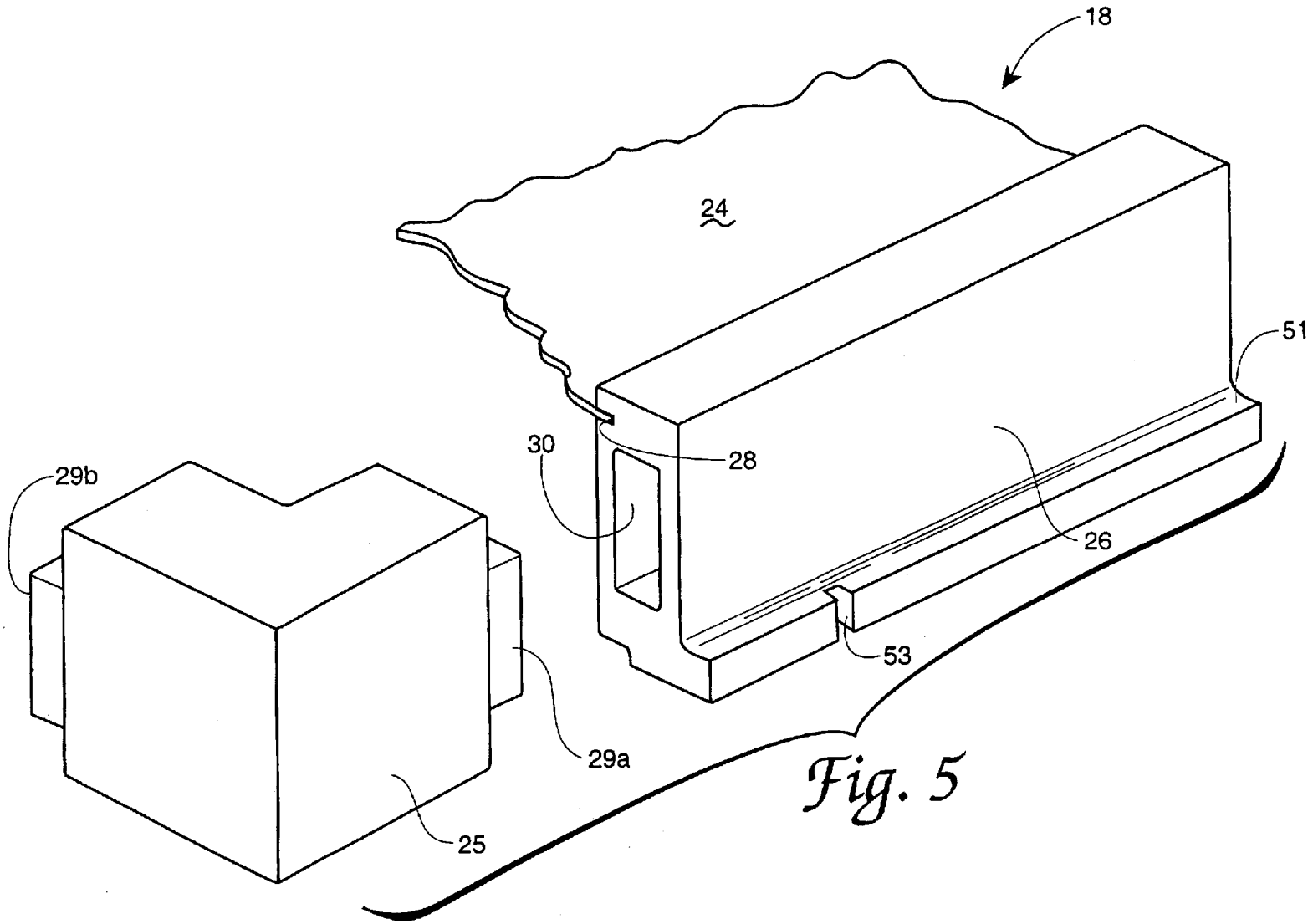
FIG. 5 is a perspective view in cutaway of one comer of the cover of the container of FIG. 1, showing the structure of the comer elements and edge extrusion elements of the cover.

Referring now to FIG. 5, shown therein is a perspective view in cutaway of one corner of cover 18 of the representative container 10 of FIG 1, showing the structure of the corner elements 25*a–d* and extruded edge elements 26*a–d*. Similar to the edge elements 32 of FIG. 2, each edge element 26*a–d* is structured as a hollow extrusion of substantially any selected length, corresponding to the respective lengths of edge elements 32*a–d* of FIG. 2 and 44*a–d* of FIG. 4 and depending on the intended size and shape of container 10 in the final assembled condition. Longitudinal slot 28 is defined in each element 26*a–d* in order to snugly receive the top panel 24 in the assembled condition. Corner elements 25 are identical to each other and, similarly to corner elements 31 of FIG. 2, include a pair of tenons 29*a,b* on adjacent edges of corner element 25 sized to be snugly received in the assembled condition by the slot 30 formed in each extruded edge element 26*a–d,* thereby substantially forming tenon/mortise joints at each corner. The lower surfaces of edge elements 26*a–d* and corner elements 25*a–d* are preferably smooth and continuous so that a seal between cover 18 and body portion 11 at gasket 48 is accomplished upon assembling container 10. In an alternative configuration, the top surfaces of edge elements 44 and corner elements 41 may present a smooth continuous surface for sealing to a gasket (not shown) provided in a groove (also not shown) in the lower surfaces of edge elements 26 and corner elements 25 of cover 18.

It is preferable that the extrusion defining each edge element 26*a–d of* cover 18 include a flange 51 in order to provide means for latching cover 18 to body portion 11 in the assembled condition shown in FIG. 1. Notch 53 may be provided at positions along flange 51 corresponding to the locations of latches 50 on body portion 11 in order to releasably secure cover 18 to body portion 11 using the latch type illustrated in FIG. 1. It is, however, noted that other conventional latch types may be used, such as a simple clamp structure (not shown) attaching body portion 11 to cover 18 at flange 51 wherein notch 53 may not be required.

A significant advantage of the container structure disclosed and claimed herein is that edge elements 32*a–d* may be fabricated from a single extrusion and cut to the appropriate length(s) corresponding to the desired size of the container. Similarly, corner posts 20*a–d,* edge elements 44*a–d,* and edge elements 26*a–d* may be fabricated from the respective extrusions and cut to the appropriate length(s) for the desired container structure size and configuration. Additionally, in certain configurations, certain extruded structural elements of the assembled container may be substantially identical. For example, a container could be configured wherein extrusions for corner posts 20 and edge elements 32 and 44 could be identical with minor machining needed on one of the extrusions for completion of the structure. Accordingly, a small number of extrusion structures would be required to structure a container of substantially any desired size. Each corner element 31*a–d,* 41*a–d* and 25*a–d* may be fabricated using conventional molding (such as injection or compression molding) and/or machining processes. One minor advantage of the corner structures just described is that the extrusions and corner elements could be sized such that the corner elements could be molded substantially identically with only minor finish machining being required on corner elements 25. The materials of construction for the component parts of the container, including all extrusions, corner elements and flat panels, may be selected by one skilled in the art guided by these teachings and preferably include plastics, such as polyvinyl chloride (PVC), chlorinated PVC (CPVC), or other extrudable materials such as styrene, polyethylene, or polypropylene, the specific selected material not considered limiting of the invention disclosed and claimed herein. In the assembled condition for the container, all joints may be preferably bonded together and hermetically sealed using commercially available adhesive, such as cyanoacrylate epoxy, silicone adhesive, or plastic weld adhesives for the plastic materials and similar adhesives for other candidate extrudable materials.

Addition of pressure relief valves, desiccant ports, humidity indicators, or other commercially available hardware (not shown) may be added to the structure of the container of the invention in order to facilitate a wide variety of uses for the invention.

The invention therefore provides an improved environmentally sealable shipping container. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A shipping container comprising:

(a) a substantially rectangular body portion having a bottom and four sides defining an opening into said body portion, said body portion including (i) a substantially rectangular bottom panel defining said bottom of said body portion and four substantially rectangular side panels defining respective said four sides of said body portion;

(ii) a first plurality of hollow extruded members defining the edges of said body portion, said extruded members including means for holding said bottom panel and said side panels in substantially perpendicular relationship to each other defining the rectangular shape of said body portion; and (iii) a second plurality of corner members interconnecting respective said extruded members at the respective corners of said body portion;

(b) a substantially rectangular cover for said container corresponding in size to said body portion, said cover including a substantially rectangular top panel and four hollow extruded members defining the edges of said cover, said four extruded members including means for attachment to said top panel, and four corner members interconnecting respective said four extruded members at the respective corners of said cover;

(c) means defining a hermetically sealable interface between said cover and said body portion;

(d) an adhesive sealably joining said bottom panel and four side panels and said corner members to said first plurality of extruded members to form said body portion, and sealably joining said top panel, corner members and to said four extruded members to form said cover; and (e) a plurality of latches for releasably attaching said cover to said body portion.

2. The container of claim 1 wherein said means for holding said bottom panel and said side panels in substantially perpendicular relationship to each other defining the rectangular shape of said body portion, and said means for attachment of said top panel to said four extruded members of said cover, comprise grooves along the lengths of each .of said extrusions for receiving an edge of the respective said bottom panel, side panels and top panel.

3. The container of claim 1 wherein said means defining a hermetically sealable interface between said cover and said body portion includes a peripheral groove in one of said four extruded members and corner members defining said cover and said first extruded members and corner members defining the opening into said body portion, and a substantially smooth continuous surface on the other of said four extruded members and corner members defining said cover and said first extruded members and corner members defining the opening into said body portion, and a gasket disposed in said groove.

4. The container of claim 1 wherein said second plurality of corner members interconnecting respective said extruded members at the respective corners of said body portion and said four corner members interconnecting respective said four extruded members at the respective corners of said cover comprise mortise joints.

5. The container of claim 1 wherein said all said extruded *members* have substantially identical cross sections.

6. The container of claim 1 wherein said extruded *members*, corner *members* and panels comprise a material selected from the group consisting of polyvinyl chloride, chlorinated polyvinyl chloride, styrene, polyethylene, and polypropylene.

7. The container of claim 1 wherein said panels, extruded members and corner *members* are bonded together and hermetically sealed using an adhesive selected from the group consisting of cyanoacrylate epoxy, silicone adhesive, or plastic weld adhesives.

* * * * *